United States Patent [19]

Kobayashi et al.

[11] Patent Number: 5,235,004
[45] Date of Patent: Aug. 10, 1993

[54] HEXENYL-CONTAINING SILICONE RESIN AND METHOD FOR ITS PREPARATION

[75] Inventors: Hideki Kobayashi; Wataru Nishiumi, both of Chiba, Japan

[73] Assignee: Dow Corning Toray Silicone Co., Ltd., Tokyo, Japan

[21] Appl. No.: 887,991

[22] Filed: May 22, 1992

[30] Foreign Application Priority Data

May 29, 1991 [JP] Japan .................................. 2-753900

[51] Int. Cl.$^5$ ............................................ C08F 283/00
[52] U.S. Cl. ..................................... 525/477; 525/478; 528/32; 528/39
[58] Field of Search ..................... 528/32, 39; 525/477, 525/478

[56] References Cited

U.S. PATENT DOCUMENTS 4,041,010 8/1977 Jeram .............................. 260/42.26

FOREIGN PATENT DOCUMENTS 400614 12/1990 European Pat. Off. .

Primary Examiner—Melvyn I. Marquis
Attorney, Agent, or Firm—Alex Weitz

[57] ABSTRACT

A hexenyl-containing silicone resin is disclosed which has the average unit formula $(CH_2=CHC_4H_8Me_2SiO_{\frac{1}{2}})_n(SiO_{4/2})_m$ wherein Me denotes a methyl radical, n and m are each numbers larger than zero, and the ratio n/m is 0.2 to 3.

10 Claims, No Drawings

HEXENYL-CONTAINING SILICONE RESIN AND METHOD FOR ITS PREPARATION

FIELD OF THE INVENTION

The present invention relates to a hexenyl-containing silicone resin and method for the preparation of same.

BACKGROUND OF THE INVENTION

Japanese Patent Publication Number 60-27691 U.S. Pat. No. 4,041,010) teaches silicone resin which is liquid at room temperature and which contains vinyl and trifluoropropyl groups and the $SiO_{4/2}$ unit. However, this publication describes neither hexenyl-containing silicone resin nor a method for the preparation thereof.

SUMMARY OF THE INVENTION

The present invention takes as an object the introduction of hexenyl-containing silicone resin which is constituted of the $CH_2=CHC_4H_8Me_2SiO_{\frac{1}{2}}$ unit and the $SiO_{4/2}$ unit, wherein Me hereinafter denotes a methyl radical. A further object of the present invention is the introduction of a method for the preparation of the aforesaid silicone resin. The present invention thus relates to a hexenyl-containing silicone resin with the following average unit formula $$(CH_2=CHC_4H_8Me_2SiO_{\frac{1}{2}})_n(SiO_{4/2})_m \quad (a)$$

wherein n and m are each numbers larger than zero, and the ratio n/m is 0.2 to 3. The present invention also relates to a method for the preparation of the above resin.

DETAILED DESCRIPTION OF THE INVENTION

To explain the preceding in greater detail, n in above formula (a) for the hexenyl-containing silicone resin according to the present invention represents the number of moles of $CH_2=CHC_4H_8Me_2SiO_{\frac{1}{2}}$ units while m represents the number of moles of $SiO_{4/2}$ units. Both n and m are to have values greater than zero, and the ratio n/m should fall within the range of 0.2 to 3. With regard to the properties of this hexenyl-containing silicone resin, it is in general a liquid at room temperature at values of n/m in excess of 1.2; it converts from liquid to solid in the range of n/m 1.2; and it is generally insoluble in organic solvents at n/m<0.2 due to the predominance of the inorganic $SiO_{4/2}$ component. Accordingly, preferred n/m ratios fall within the range of 0.2 to 3.0. The hexenyl-containing silicone resin according to the present invention is soluble in, for example, aromatic solvents such as benzene and toluene and alkanes such as hexane and heptane.

The hexenyl-containing silicone resin according to the present invention can be synthesized by the following method: cohydrolysis, in the presence of organic solvent and acidic aqueous solution, of (b) an organosilicon compound with the general formula $$CH_2=CHC_4H_8Me_2SiX \quad (b)$$

and (c) a silicon compound with the general formula $$SiX_4 \quad (c)$$

wherein X is a halogen atom such as chlorine or bromine or an alkoxy group such as methoxy, ethoxy, propoxy, or butoxy, and subsequently subjecting the hexenyl-containing silicone resin solution afforded thereby to a water wash, neutralization, and water elimination, followed by thermal dehydration in the presence of an alkali metal catalyst, and finally a water wash and neutralization.

The cohydrolysis of organosilicon compound (b) and silicon compound (c) can be carried out, for example, by making up an organic solvent solution of their mixture and (i) dripping this solution into an acidic aqueous solution while stirring or (ii) dripping the acidic aqueous solution into the organic solvent solution while stirring.

The organic solvent should be capable of dissolving the compound with general formula (b), the compound with general formula (c), and the hexenyl-containing silicone resin product. Examples of such organic solvents are aromatic solvents such as benzene, toluene, and xylene; alkanes such as hexane and heptane; ethers such as tetrahydrofuran; and ketones such as methyl isobutyl ketone. Among these, hexane, heptane, toluene, and xylene, with their poor water solubilities, are preferred.

The concentrations of compounds (b) and (c) in the organic solvent should be selected in accordance with the desired workability; however, as a general matter, these concentrations should be adjusted so as to give values of 10 to 80 weight % for the concentration of the hexenyl-containing silicone resin product in the organic solvent. The acidic aqueous solution may be the aqueous solution of an acid such as sulfuric acid, nitric acid, or hydrochloric acid, and aqueous hydrochloric acid solutions are preferred. When hydrochloric acid is used, the hydrogen chloride concentration must be at least 5 weight %. The temperature during and after addition is optimally 0° to 100° C.

In order to work up the hexenyl-containing silicone resin solution afforded by the cohydrolysis of organosilicon compound with general formula (b) and silicon compound with general formula (c), organic solvent or water is added as necessary followed by quiescence and separation of the aqueous layer. The organic solvent layer (contains the hexenyl-containing silicone resin) is then washed with water to neutrality. A water elimination is preferably also carried out. When the organic solvent has only an insignificant water solubility, this water elimination can be run at the organic solvent's azeotrope using a water separator.

This hexenyl-containing silicone resin will contain a moderate quantity of residual silanol groups, and these can be condensed with each other in a dehydration reaction run by adding alkali metal catalyst to the organic solvent solution of the hexenyl-containing silicone resin and heating. This makes possible at the same time an adjustment in the properties of the hexenyl-containing silicone resin (e.g., softening point and so forth) by an adjustment in its molecular weight distribution through re-equilibration. The alkali metal catalyst is exemplified by alkali metal silanolates and alkali metal hydroxides such as potassium hydroxide, sodium hydroxide, and cerium hydroxide. This process of residual silanol group condensation is preferred from the standpoint of the stability of the properties of the hexenyl-containing silicone resin. The hexenyl-containing silicone resin according to the present invention is then recovered by neutralizing the alkali metal catalyst, washing with water, another water elimination, and finally stripping off the organic solvent.

In another method, the residual silanol groups in the hexenyl-containing silicone resin may be capped using its organic solvent solution and (d) an organosilicon compound with the general formula $$(R'_3Si)_aQ \quad (d)$$

wherein R' is a substituted or unsubstituted monovalent hydrocarbon group having 1 to 8 carbons and a=1 or 2. When a=1, Q represents hydrogen, halogen, hydroxyl, alkoxy, —NR"$_2$, —ONR"$_2$, or —OCOR"; when a=2, Q represents —O— or —NR"—; in which R"=hydrogen or alkyl in each case.

The organosilicon compound with general formula (d) is a compound which readily reacts with the silanol group. The group R' in the preceding formula is a monovalent hydrocarbon group having 1 to 8 carbons or a substituted monovalent hydrocarbon group having 1-8 carbon atoms. R' may be exemplified by alkyl radicals, such as methyl, ethyl, propyl and butyl; alkenyl radicals, such as vinyl and allyl; aryl radicals, such as phenyl; and halogenated hydrocarbon radicals, such as 3,3,3-trifluoropropyl. The individual molecule may contain only a single species or multiple species of R'.

The value of a in formula (d) is 1 or 2. When a=1, Q represents hydrogen, halogen, hydroxyl, alkoxy, —NR"$_2$, —ONR"$_2$, or —OCOR". The halogen and alkoxy in this case are exemplified by those provided as exemplary for organosilicon compound with general formula (b). When a=2, Q represents —O— or —NR"—. The group R" represents hydrogen or alkyl, wherein said alkyl is exemplified by methyl, ethyl, propyl, butyl, and pentyl. While this organosilicon compound should be used in a quantity which will depend on the residual quantity of silanol groups, the use of 10 to 70 weight parts per 100 weight parts hexenyl-containing silicone resin with average unit formula (a) will be sufficient, and any excess is eliminated. Said organosilicon compound with general formula (d) is added to a solution of the hexenyl-containing silicone resin with heating as necessary. Then, in order to recover the hexenyl-containing silicone resin according to the present invention, the solution of hexenyl-containing silicone resin is subsequently washed with water to neutrality, subjected to a water elimination as above, and finally stripped of organic solvent.

In the case of the application of said organosilicon compound with general formula (d), the R'$_3$SiO$_{\frac{1}{2}}$ unit, a siloxane unit not represented in general unit formula (a), will be present in small quantities, but this nevertheless falls within the scope of the present invention. In addition, the hexenyl-containing silicone resin with average unit formula (a) may contain small quantities of other siloxane units as long as the object of the present invention is not impaired.

The hexenyl-containing silicone resin according to the present invention finds utility in a variety of applications because it is a silicone resin which contains the highly functional hexenyl group and is soluble in organic solvents. Within the particular realm of addition-reaction-curing (hydrosilylation) silicone compositions, it is useful as a more highly curable filler since the hexenyl group is more active than the commonly used vinylsiloxane unit. Moreover, since the surface of this resin is covered with long methylene chains, it is useful as a resin with a higher surface energy than the conventional methylsilicone resins and vinylsilicone resins.

EXAMPLES

Illustrative examples of the present invention are given below, in which Me denotes a methyl radical. Unless otherwise indicated, all parts and percents are on a weight basis.

EXAMPLE 1

The following were introduced into a flask and heated to 50° C. with stirring: 7.95 g (0.045 mol) chlorosilane CH$_2$=CHC$_4$H$_8$Me$_2$SiCl, 20.83 g (0.1 mol) tetraethoxysilane, 6.3 g toluene, and 4.2 g tetrahydrofuran. A mixture of 5.0 g water and 3.4 g 36% hydrochloric acid was dripped into the reaction system over 30 minutes. Stirring was continued for an additional 4 hours at 77° C.-80° C. after the completion of addition. Then, after cooling and quiescence, the polymer (lower) layer was collected. The aqueous layer was extracted with 30 mL toluene, and the polymer and toluene layers were then combined and washed once with 50 mL water. This was followed by repeated washing with water after adjusting to pH 7 with 3 weight % aqueous sodium bicarbonate. After transfer to a flask equipped with a water separator, a water elimination step was carried out by heating at the reflux temperature. Cooling and solvent removal then afforded 11.7 g of a transparent, light yellow oil.

A vinyl group content of 9.0 weight % was determined by dissolving this oil in carbon tetrachloride, addition-reaction with an acetic acid solution of iodine chloride, addition of potassium iodide, and titration by sodium thiosulfate. The analytical results for this oil are reported below.

$^{29}$Si NMR, delta (ppm):

13(0.32 Si, br, CH$_2$=CHC$_4$H$_8$Me$_2$SiO$_{\frac{1}{2}}$)
−100(0.17 Si, br, ROSiO$_{3/2}$)
−110(0.51 Si, br, SiO$_{4/2}$)
(R=CH$_3$CH$_2$ or H)

$^{13}$C NMR, delta (ppm)

139(1.05 C, s, =CH—)
115(1.00 C, s, CH$_2$=)
34(1.05 C, s, Si(CH$_2$)$_3$C̲H$_2$—)
33(0.95 C, s, Si(CH$_2$)$_2$C̲H$_2$—)
28(0.55 C, s, —OC̲H$_2$CH$_3$)
23(0.90 C, s, SiC̲H$_2$CH$_2$—)
18(1.50 C, s, SiCH$_2$— and/or —OCH$_2$C̲H$_3$)
0(2.05 C, s, SiC̲H$_3$)

GPC (gel permeation chromatography)

M$_w$ (weight-average molecular weight)=5.9×10$^3$
M$_n$ (number-average molecular weight)=5.1×10$^3$ This hexenyl-containing silicone resin was thus confirmed to be a compound with a chemical structure represented by the following formula $$(CH_2=CHC_4H_8Me_2SiO_{\frac{1}{2}})_{0.47}(SiO_{4/2})_{1.0}$$

which carried residual hydroxyl and ethoxy groups at its terminals.

EXAMPLE 2

Hexenyl-containing silicone resin (12.0 g) was prepared by the same method as in Example 1, but in the present case using 7 g toluene in place of the 6.3 g toluene and 4.2 g tetrahydrofuran employed in Example 1.

This silicone resin was a colorless gum. The analytical results for this silicone resin are reported below.

$^{29}$Si NMR, delta (ppm)

13(0.30 Si, br, $CH_2=CHC_4H_8Me_2SiO_{\frac{1}{2}}$)
−100(0.20 Si, br, $ROSiO_{3/2}$)
−110(0.50 Si, br, $SiO_{4/2}$)
(R=$CH_3CH_2$ or H)

$^{13}$C NMR, delta (ppm)

139(0.95 C, s, =CH—)
115(1.00 C, s, $CH_2$=)
34(1.00 C, s, $Si(CH_2)_3\underline{C}H_2$—)
33(0.95 C, s, $Si(CH_2)_2\underline{C}H_2$—)
28(0.70 C, s, —O$\underline{C}H_2CH_3$)
23(1.10 C, s, $Si\underline{C}H_2CH_2$—)
18(1.65 C, s, $Si\underline{C}H_2$— and/or -O$CH_2\underline{C}H_3$)
0(1.95 C, s, $Si\underline{C}H_3$)

GPC (gel permeation chromatography)

$M_w$ (weight-average molecular weight)=$1.0 \times 10^4$
$M_n$ (number-average molecular weight)=$4.6 \times 10^3$
vinyl group weight %: 9.0%

This hexenyl-containing silicone resin was thus confirmed to be a compound with a chemical structure represented by the following formula $(CH_2=CHC_4H_8Me_2SiO_{\frac{1}{2}})_{0.43}(SiO_{4/2})_{1.0}$ which carried residual hydroxyl and ethoxy groups at its terminals.

EXAMPLE 3

Toluene (25.0 g) and 10% aqueous KOH (0.1 g) were added to 10.0 g of the hexenyl-containing silicone resin prepared in Example 2, and this was heated under reflux for 6 hours. After cooling, the chlorosilane $Me_3SiCl$ (0.02 g) was added, and neutralization was carried out by stirring for 30 minutes at room temperature.

After washing with water, a water elimination was conducted using a water separator by heating under reflux, and the toluene was then removed. The reaction product was a gum weighing 8.8 g. The analytical results for this silicone resin are reported below.

$^{29}$Si NMR, delta (ppm)

13(0.30 Si, br, $CH_2=CHC_4H_8Me_2SiO_{\frac{1}{2}}$)
−100(0.14 Si, br, $ROSiO_{3/2}$)
−110(0.56 Si, br, $SiO_{4/2}$)
(R=$CH_3CH_2$ or H)

$^{13}$C NMR, delta (ppm)

139(1.00 C, s, =CH-)
115(1.00 C, s, $CH_2$=)
34(0.90 C, s, $Si(CH_2)_3\underline{C}H_2$—)
33(0.95 C, s, $Si(CH_2)_2\underline{C}H_2$—)
28(0.45 C, s, —O$\underline{C}H_2CH_3$)
23(1.10 C, s, $Si\underline{C}H_2CH_2$—)
18(1.40 C, s, $Si\underline{C}H_2$— and/or -O$CH_2\underline{C}H_3$)
0(2.20 C, s, $Si\underline{C}H_3$)

GPC (gel permeation chromatography)

$M_w$ (weight-average molecular weight)=$1.2 \times 10^4$
$M_n$ (number-average molecular weight)=$4.7 \times 10^3$
vinyl group weight %: 9.2%

This hexenyl-containing silicone resin was thus confirmed to be a compound with a chemical structure represented by the following average unit formula $(CH_2=CHC_4H_8Me_2SiO_{\frac{1}{2}})_{0.43}(SiO_{4/2})_{1.0}$ which carried residual hydroxyl and ethoxy groups at its terminals.

EXAMPLE 4

Toluene (6 g) was added to hexenyl-containing silicone resin from Example 2, followed by the addition of 4.2 g (0.026 mol) $(Me_3Si)_2NH$ and heating under reflux for 6 hours. This was followed by cooling, a single wash with 50 g water, neutralization with aqueous hydrochloric acid, and then repeated washing with water. A water elimination was subsequently run using a water separator by heating at reflux, and the solvent was then distilled off to afford 12.3 g of a gum.

The analytical results for this silicone resin are reported below.

$^{29}$Si NMR, delta (ppm)

13(0.35 Si, br, $R'Me_2SiO_{\frac{1}{2}}$)
−100(0.16 Si, br, $ROSiO_{3/2}$)
−110(0.49 Si, br, $SiO_{4/2}$)
(R=$CH_3CH_2$ or H
R′=$CH_2=CH(CH_2)_4$ or Me)

$^{13}$C NMR, delta (ppm)

139(0.90 C, s, =CH—)
115(1.00 C, s, $CH_2$=)
34(1.05 C, s, $Si(CH_2)_3\underline{C}H_2$—)
33(1.00 C, s, $Si(CH_2)_2\underline{C}H_2$—)
28(0.40 C, s, —O$\underline{C}H_2CH_3$)
23(0.95 C, s, $Si\underline{C}H_2CH_2$—)
18(1.45 C, s, $Si\underline{C}H_2$— and/or -O$CH_2\underline{C}H_3$)
0(2.70 C, s, $Si\underline{C}H_3$)

GPC (gel permeation chromatography)

$M_w$ (weight-average molecular weight)=$1.0 \times 10^4$
$M_n$ (number-average molecular weight)=$4.5 \times 10^3$
vinyl group weight %: 8.4%

This hexenyl-containing silicone resin was thus confirmed to be a compound with a chemical structure represented by the following average unit formula $(CH_2=CHC_4H_8Me_2SiO_{\frac{1}{2}})_{0.41}(Me_3SiO_{\frac{1}{2}})_{0.13}(SiO_{4/2})_{1.0}$ which carried residual hydroxyl and ethoxy groups at its terminals.

EXAMPLE 5

A solid white silicone resin was prepared by the same method as in Example 2, but in the present case using 7.07 g (0.04 mol) of the chlorosilane $CH_2=CHC_4H_8Me_2SiCl$, 20.83 g (0.1 mol) tetraethoxysilane, and 8 g toluene. Toluene (6 g) was then added to the silicone resin product followed by the addition of 4.2 g (0.026 mol) $(Me_3Si)_2NH$ and heating under reflux for 6 hours. After cooling, a single water wash with 50 g water, and neutralization with aqueous hydrochloric acid, repeated washing with water was then carried out. A water elimination was subsequently run using a water separator by heating under reflux, and the toluene was finally distilled off to afford 9.3 g of a white solid. This white solid was soluble in benzene, toluene, hexane, heptane, methyl isobutyl ketone, diisobutyl ketone, and tetrahydrofuran.

The analytical results for this silicone resin are reported below.

$^{29}$Si NMR, delta (ppm)

13(0.30 Si, br, R'Me$_2$SiO$_{\frac{1}{2}}$)
−100(0.13 Si, br, ROSiO$_{3/2}$)
−110(0.57 Si, br, SiO$_{4/2}$)
(R=CH$_3$CH$_2$ or H
R'=CH$_2$=CH(CH$_2$)$_4$ or Me)

$^{13}$C NMR, delta (ppm)

139(0.95 C, s, =CH—)
115(1.00 C, s, CH$_2$=)
34(1.10 C, s, Si(CH$_2$)$_3$$\underline{C}$H$_2$—)
33(1.00 C, s, Si(CH$_2$)$_2$$\underline{C}$H$_2$—)
28(0.25 C, s, —O$\underline{C}$H$_2$CH$_3$)
23(0.95 C, s, Si$\underline{C}$H$_2$CH$_2$—)
18(1.30 C, s, Si$\underline{C}$H$_2$— and/or —OCH$_2$$\underline{C}$H$_3$)
0(2.55 C, s, Si$\underline{C}$H$_3$)

GPC (gel permeation chromatography)

M$_w$ (weight-average molecular weight)=1.5×10$^4$
M$_n$ (number-average molecular weight)=4.8×10$^3$
vinyl group weight %: 8.2%

This white solid was thus confirmed to be a compound with a chemical structure represented by the following average unit formula

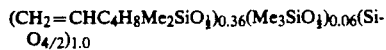
(CH$_2$=CHC$_4$H$_8$Me$_2$SiO$_{\frac{1}{2}}$)$_{0.36}$(Me$_3$SiO$_{\frac{1}{2}}$)$_{0.06}$(SiO$_{4/2}$)$_{1.0}$ which carried residual hydroxyl and ethoxy groups at its terminals.

EXAMPLE 6

A white solid (9.3 g) was prepared by the method of Example 5, but in the present case using 6.88 g (0.04 mol) CH$_2$=CH C$_4$H$_8$Me$_2$SiOMe in place of the chlorosilane CH$_2$=CHC$_4$H$_8$Me$_2$SiCl and using 17.0 g (0.1 mol) SiCl$_4$ in place of the tetraethoxysilane.

The analytical results for this silicone resin are reported below.

$^{29}$Si NMR, delta (ppm)

13(0.31 Si, br, R'Me$_2$SiO$_{\frac{1}{2}}$)
−100(0.13 Si, br, ROSiO$_{3/2}$)
−110(0.50 Si, br, SiO$_{4/2}$)
(R=H
R'=CH$_2$=CH(CH$_2$)$_4$ or Me)

$^{13}$C NMR, delta (ppm)

139(0.95 C, s, =CH—)
115(1.00 C, s, CH$_2$=)
34(1.05 C, s, Si(CH$_2$)$_3$$\underline{C}$H$_2$—)
33(1.05 C, s, Si(CH$_2$)$_2$$\underline{C}$H$_2$—)
23(1.00 C, s, Si$\underline{C}$H$_2$CH$_2$—)
18(0.95, s, Si$\underline{C}$H$_3$)
0(2.65 C, s, Si$\underline{C}$H$_3$)

GPC (gel permeation chromatography)

M$_w$ (weight-average molecular weight)=1.4×10$^4$
M$_n$ (number-average molecular weight)=4.5×10$^3$
vinyl group weight %: 8.0%

This white solid was thus confirmed to be a compound with a chemical structure represented by the following average unit formula

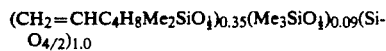
(CH$_2$=CHC$_4$H$_8$Me$_2$SiO$_{\frac{1}{2}}$)$_{0.35}$(Me$_3$SiO$_{\frac{1}{2}}$)$_{0.09}$(SiO$_{4/2}$)$_{1.0}$ which carried residual hydroxyl groups at its terminals.

That which is claimed is:

1. A hexenyl-containing silicone resin consisting of the average unit formula

(CH$_2$=CHC$_4$H$_8$MeSiO$_{\frac{1}{2}}$)$_n$(SiO$_{4/2}$)$_m$ wherein Me denotes a methyl radical, n and m are each numbers larger than zero, and the ratio n/m is 0.2 to 3.

2. The hexenyl-containing silicone resin of claim 1 which is prepared by a process comprising: cohydrolyzing, in the presence of organic solvent and aqueous acid solution, a mixture consisting of an organosilicon compound (b) having the general formula

CH$_2$=CHC$_4$H$_8$Me$_2$SiX with a silicon compound (c) having the general formula

SiX$_4$ wherein Me denotes a methyl radical and X is selected from the group consisting of halogen and alkoxy, and subsequently subjecting the hexenyl-containing silicone resin solution afforded thereby to a water wash, neutralization, and water elimination.

3. The hexenyl-containing silicone resin according to claim 2, wherein X is selected from the group consisting of chlorine and methoxy.

4. The hexenyl-containing silicone resin of claim 1 which is prepared by a process comprising:
(I) cohydrolyzing, in the presence of organic solvent and aqueous acid solution, a mixture consisting of a first organosilicon compound (b) having the general formula

CH$_2$=CHC$_4$H$_8$Me$_2$SiX with a silicon compound (c) having the following general formula

SiX$_4$ wherein Me denotes a methyl radical and X is selected from the group consisting of halogen and alkoxy, and subsequently subjecting the hexenyl-containing silicone resin solution afforded thereby to a water wash, neutralization, and water elimination; and
(II) thermally dehydrating the resin formed in step (I) in the presence of an alkali metal catalyst.

5. The hexenyl-containing silicone resin according to claim 4, wherein X is selected from the group consisting of chlorine and methoxy.

6. The hexenyl-containing silicone resin of claim 1 which is prepared by a process comprising:
(I) cohydrolyzing, in the presence of organic solvent and aqueous acid solution, a mixture consisting of a first organosilicon compound (b) having the general formula

CH$_2$=CHC$_4$H$_8$Me$_2$SiX with a silicon compound (c) having the following general formula

SiX$_4$ wherein Me denotes a methyl radical and X is selected from the group consisting of halogen and alkoxy, and subsequently subjecting the hexenyl-containing silicone resin solution afforded thereby to a water wash, neutralization, and water elimination; and (II) capping the resin formed in step (I) by reacting it with a second organosilicon compound (d) having the general formula $(R'_3Si)_aQ$ wherein R' is a substituted or unsubstituted monovalent hydrocarbon group having 1 to 8 carbon atoms and a is 1 or 2, such that when a=1, Q is a monovalent group selected from the group consisting of hydrogen, halogen, hydroxyl, alkoxy, —NR''$_2$, and —ONR''$_2$, —OCOR'' and when a=2, Q is a divalent group selected from the group consisting of —O— and —NR''—, R'' in the above formulas being selected from the group consisting of hydrogen and an alkyl radical.

7. The hexenyl-containing silicone resin according to claim 6, wherein X is selected from the group consisting of chlorine and methoxy.

8. The hexenyl-containing silicone resin according to claim 7, wherein R' is a methyl radical.

9. The hexenyl-containing silicone resin according to claim 8, wherein a is 1 and Q is chlorine.

10. The hexenyl-containing silicone resin according to claim 8, wherein a is 2 and Q is the group —NR''—, in which R'' is an alkyl radical having 1–5 carbon atoms.

* * * * *